United States Patent
Bhanage et al.

(10) Patent No.: US 10,938,629 B1
(45) Date of Patent: Mar. 2, 2021

(54) MITIGATION OF WIRELESS INTERFERENCE

(71) Applicant: Cisco Technology Inc., San Jose, CA (US)

(72) Inventors: Gautam Bhanage, Milpitas, CA (US); Matthew Aaron Silverman, Shaker Heights, OH (US); Pooya Monajemi, Irvine, CA (US); Brian Hart, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/571,360

(22) Filed: Sep. 16, 2019

(51) Int. Cl.
| | | |
|---|---|---|
| *H04L 5/00* | (2006.01) | |
| *H04L 12/24* | (2006.01) | |
| *H04L 12/26* | (2006.01) | |
| *H04W 72/08* | (2009.01) | |
| *H04W 88/08* | (2009.01) | |
| *H04W 84/12* | (2009.01) | |

(52) U.S. Cl.
CPC ........ *H04L 41/0668* (2013.01); *H04L 5/0007* (2013.01); *H04L 43/16* (2013.01); *H04W 72/082* (2013.01); *H04W 84/12* (2013.01); *H04W 88/08* (2013.01)

(58) Field of Classification Search
CPC .................................................. H04L 41/0668
See application file for complete search history.

(56) References Cited

U.S. PATENT DOCUMENTS

| | | | |
|---|---|---|---|
| 8,356,226 B2 | 1/2013 | Ojala et al. | |
| 9,014,210 B2 | 4/2015 | Chen et al. | |
| 9,408,206 B2 | 8/2016 | Calin | |
| 2007/0054682 A1* | 3/2007 | Fanning | H04L 27/2608 455/509 |
| 2014/0301262 A1* | 10/2014 | Homchaudhuri | H04W 52/0216 370/311 |
| 2015/0117342 A1* | 4/2015 | Loehr | H04W 72/10 370/329 |
| 2019/0124653 A1 | 4/2019 | Chae et al. | |

(Continued)

OTHER PUBLICATIONS

"Design and Performance Evaluation of a Distributed OFDMA-Based MAC Protocol for MANETs," ScientificWorldJournal, J. Park, J. Chung. H. Lee, and J. Lee, vol. 2014 Article ID 708798—2014.

(Continued)

*Primary Examiner* — John D Blanton
(74) *Attorney, Agent, or Firm* — Baker Botts, LLP

(57) ABSTRACT

A method is provided in wireless access point in a wireless communications network. The method includes assigning a first resource unit for a first transmission between the wireless access point and a wireless terminal. The method further includes determining that the first transmission using the first resource unit failed. The method further includes selecting a candidate resource unit for a retry transmission. The candidate resource unit is selected based on at least an average previous success rate of available resource units at a width of the first resource unit and a correlation between the candidate resource unit and the first resource unit. The method further includes assigning the candidate resource unit for the retry transmission if a success rate of the candidate resource unit is above a predetermined threshold.

18 Claims, 3 Drawing Sheets

(56) References Cited

U.S. PATENT DOCUMENTS

2019/0261354 A1* 8/2019 Fakoorian ............... H04L 1/08
2019/0297636 A1* 9/2019 Gupta ............... H04L 1/1614

OTHER PUBLICATIONS

"Delay Analysis of OFDMA-Aloha", A. Mutairi, S. Roy. and G. Hwang, IEEE Transactions on Wireless Communications, vol. 12, No. 1—Jan. 2013.

"OFDMA Architectures, Protocols, and Applications", EURASIP Journal on Wireless Communications and Networking, Article No. 703083 (due to size, this article has been split into three separate parts)—Apr. 16, 2009.

"Adaptive resource allocation in multiuser OFDM systems with proportional rate constraints," IEEE Transactions on Wireless Communications, Z. Shen, J.G. Andrews, and B.L. Evans, vol. 4, No. 6—Nov. 2005.

"Optimal Resource Allocation in OFDMA Systems with Imperfect Channel Knowledge", I.C. Wong and B.L. Evans, IEEE Transactions on Wireless Communications, vol. 57, No. 1—Jan. 2009.

"A Low Complexity Algorithm for Proportional Resource Allocation in OFDMA Systems" I.C. Wong, Z. Shen, B.L. Evans, J.G. Andrews, IEEE Workshop on Signal Processing systems—Oct. 2004.

"Optimal Downlink OFDMA Resource Allocation With Linear Complexity to Maximize Ergodic Rates", I.C. Wong and B.L. Evans, IEEE Transactions on Wireless Communications, vol. 7, No. 2—Feb. 2008.

"Adaptive Downlink OFDMA Resource Allocation", I.C. Wong and B.L. Evans, IEEE Asilomar Conference on Signals, Systems and Computers, Pacific Grove, CA—Oct. 26-28, 2006.

* cited by examiner

MITIGATION OF WIRELESS INTERFERENCE

TECHNICAL FIELD

Certain embodiments of the present disclosure relate, in general, to wireless communications systems, and, in particular, to addressing wireless interference.

BACKGROUND

Orthogonal frequency-division multiple access (OFDMA) is a multi-user version of the popular orthogonal frequency-division multiplexing (OFDM) digital modulation scheme. Multiple access is achieved in OFDMA by assigning subsets of subcarriers to individual users. OFDMA has been used in scheduling resources on cellular networks, such as long term evolution (LTE), that operate on licensed bands. More recently, OFDMA may be used in wireless local area networks (WLANs) that may operate in unlicensed bands. Interference is a perennial problem that causes signals and packets to be dropped and the retransmission of data. Interference may be especially prevalent in unlicensed spectra, which may be used by a variety of providers and/or transmission sources.

BRIEF DESCRIPTION OF THE DRAWINGS

For a more complete understanding of the disclosed embodiments and their features and advantages, reference is now made to the following description, taken in conjunction with the accompanying drawings, in which.

DESCRIPTION OF EXAMPLE EMBODIMENTS

Overview

Figure 1:
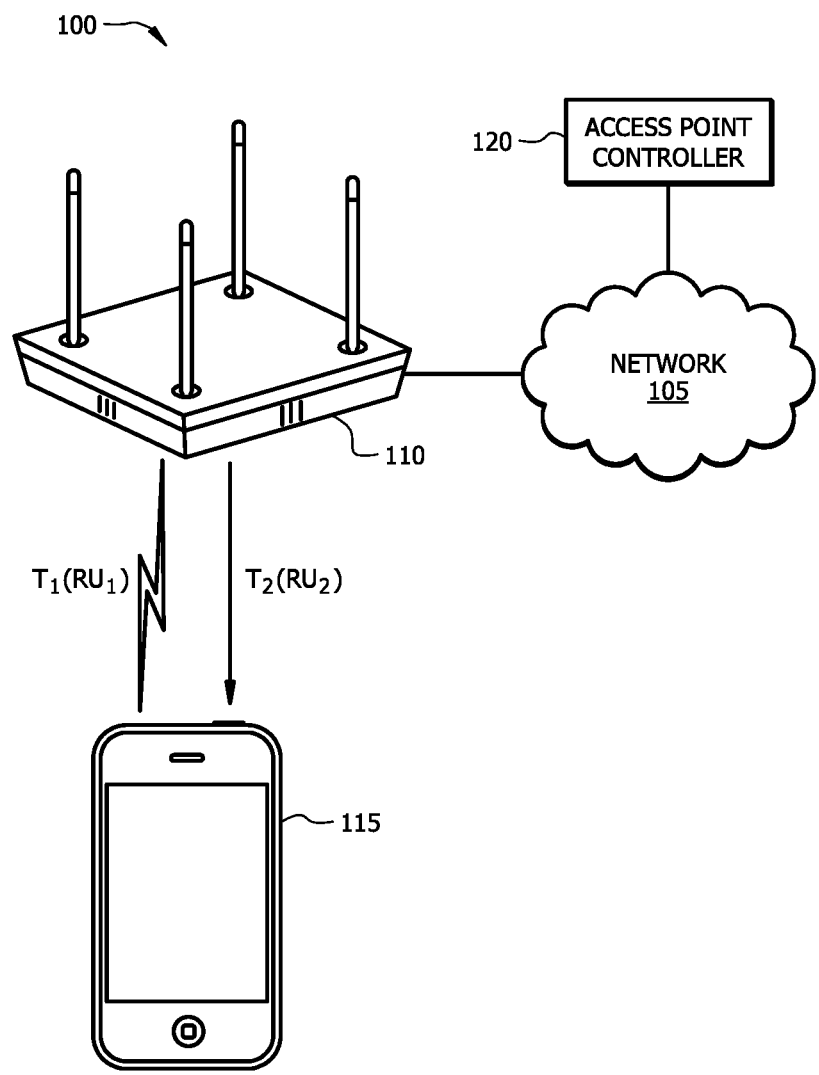
FIG. 1 illustrates an example wireless network with a wireless access point, in accordance with certain embodiments.

According to an embodiment, a method is provided in wireless access point in a wireless communications network. The method includes assigning a first resource unit for a first transmission between the wireless access point and a wireless terminal. The method further includes determining that the first transmission using the first resource unit failed. The method further includes selecting a candidate resource unit for a retry transmission. The candidate resource unit is selected based on at least an average previous success rate of available resource units at a width of the first resource unit and a correlation between the candidate resource unit and the first resource unit. The method further includes assigning the candidate resource unit for the retry transmission if a success rate of the candidate resource unit is above a predetermined threshold.

As described in detail herein, one or more embodiments provided in this disclosure may include one or more technical advantages or solutions to existing technical problems. As one example, certain embodiments reduce the amount of wireless resources that are required for a successful transmission. This may be made possible by providing efficient RU selection using tracked statistics of the success of RUs for each wireless client served by the AP. Using this information, the AP may not only determine which RUs may have the most success, but may also consider which RUs are most distant or least correlated with the failed RU. In this manner, the AP may select a RU that has a high prior success rate, but is also significantly different from the failed RU.

As another example, the AP may also consider the width for a candidate RU to ensure a high likelihood of success of the retransmission. For example, the success rate of a candidate RU may be compared to a threshold success rate for the previous RU width. If below the threshold, a narrower RU may be considered for use in the retransmission. In this manner, the AP may select the resources for a retransmission that will have a higher likelihood of success. Certain embodiments may have none, some, or all of the above-recited advantages. Other advantages may be readily apparent to one having skill in the art in light of the present disclosure.

Example Embodiments

Embodiments of the present disclosure and their advantages are best understood by referring to FIGS. 1 through 4 of the drawings, like numerals being used for like and corresponding parts of the various drawings. Although certain embodiments may be described in reference to particular illustrated examples, the disclosure herein is not limited to the particular illustrated embodiments and/or configurations and includes any and all variants of the illustrated embodiments and any and all systems, methods, or apparatuses consistent with the teachings of this disclosure, as understood by a person having ordinary skill in the art.

Wireless interference continues to cause unnecessary duplication of signals, thereby increasing the amount of wireless resources that are needed to send data in a wireless network. In particular, if a downlink OFDMA transmission is made by an access point (AP) to multiple wireless clients, the source of interference may not span the entire operating bandwidth of the AP. However, if a packet is lost, e.g., a protocol data unit (PDU) is lost, retrying the same OFDMA PDU transmission using similar resource units has a high probability of also failing due to interference on the same sub-band at the wireless device. Accordingly, retrying the transmission with similar resources may not alleviate the issues caused by interference.

Moreover, due to current wireless channel conditions, wireless clients may experience frequency selective fading due to the selection of particular resource units (RUs) in the AP's scheduling computation. As with the previous issue, if the transmission is retried on the same set of RUs for the wireless client, a transmission failure is likely to result. Conventionally, the types of packet losses described above are addressed by initiating a rate control algorithm/method that prompts the AP and wireless clients to use lower rates. This may increase the chance of successful transmission completion if interference in those frequencies/resource units is temporary, but may considerably increase the congestion of wireless signaling on the WLAN, which increases the chance of collisions, resulting in more retransmissions. Accordingly, there is a need for a technically improved access point that can schedule resources efficiently to address interference in wireless networks, including those operating in unlicensed spectra.

Described herein are solutions addressing one or more of the technical problems identified above. For example, certain embodiments describe systems and methods that efficiently control the scheduling of resource units in the event of a failed transmission. For example, the selection of the subsequent RU (or set of RUs) for a retransmission to the same wireless client may not merely repeat the earlier selection or be a random selection based on available RUs, but be based on the success rates of candidate RUs and the correlation between the failed RU and candidate RUs. In this manner, the selection of the RU for a retransmission may have a higher chance of success, which reduces the need for further retransmissions and the lowering of rates. Further technical improvements are detailed herein in reference to particular embodiments.

Although the subject matter described herein may be implemented in any appropriate type of system using any suitable components, the embodiments disclosed herein are described in relation to a wireless network, such as the example wireless network 100 illustrated in FIG. 1. For simplicity, FIG. 1 illustrates wireless network 100 with an access point 110 controlled by an access point controller 120, optionally over a network 105. The access point 110 provides wireless communications to a wireless device 115. In practice, wireless network 100 may further include any additional elements suitable to support communication between wireless devices or between a wireless device and another communication device, such as a landline telephone, a service provider, or any other network node or end device. Wireless network 100 may provide communication and other types of services to one or more wireless devices to facilitate the wireless devices' access to and/or use of the services provided by, or via, the wireless network.

Generally, access point 110 may assign one or more radio transmission resources, including RU1, for a first transmission T1 to wireless device 115. In some situations, transmission T1 may fail. For example, interference may cause wireless device 115 to be unable to distinguish transmission T1 from other wireless signals and/or noise. Access point 110 may determine that transmission T1 has failed, either through an explicit notification from wireless device 115 or implicitly through the lack of receiving an acknowledgement indication from wireless device 115 or another portion of wireless network 100. Access point 110 may attempt to retry the transmission, e.g., via transmission T2 using resource units including resource unit RU2.

In certain embodiments, transmission T2 uses the same resource units as transmission T1. As noted above, however, the use of the same resource unit, e.g., RU1 is the same as RU2, may have a low likelihood of success if the interference is persistent. Instead, access point 110 may determine that a different resource unit (or set of resource units) may be more likely to avoid the interference, e.g., if the interference is only in a particular frequency band. In this manner, access point 110 may use suitable resource units for retries of transmissions, which may reduce the failure rate of retried transmissions and thereby, reduce wireless congestion.

Access point 110 alone or together in conjunction with access point controller 120 may determine which resource units to assign for transmissions. For example, access point 110 and/or access point controller 120 may implement a selection scheme based on measurements and tracking of transmissions between access point 110 and wireless device 115. For example, in certain embodiments, access point 110 and/or access point controller 120 may store the successes and failures (specifically or in an aggregate manner as a success rate) of previous transmissions on each resource unit (RU) for each wireless device, including wireless device 115. In certain embodiments, access point 110 assigns RUs for retries of failed transmissions based on the stored information. Further descriptions of particular embodiments of access point 110 are described below in reference to FIG. 2.

In certain embodiments, access point controller 120 is integrated within access point 110. For example, access point controller 120 may be implemented on hardware and/or software that may overlap or be discrete from hardware and/or software providing other functionality of access point 110. In other embodiments, access point controller 120 is implemented on a separate hardware and/or software from access point 110. For example, one or more functions of access point controller 120 may be implemented on hardware and/or software that is remote from access point 110 and may be communicatively coupled to access point 110, e.g., via network 105.

Wireless network 100 and/or network 105 may comprise and/or interface with any type of communication, telecommunication, data, cellular, and/or radio network or other similar type of system. In some embodiments, wireless network 100 and/or network 105 may be configured to operate according to specific standards or other types of predefined rules or procedures. Thus, particular embodiments of wireless network 100 and/or network 105 may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Wireless network 100 and/or network 105 may further include one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices. In certain embodiments, wireless network 100 and/or network 105 may comprise any number of wired or wireless networks, network nodes, base stations, controllers, wireless devices, relay stations, and/or any other components or systems that may facilitate or participate in the communication of data and/or signals whether via wired or wireless connections.

As used herein, access point 110 and wireless device 115 may include any device capable, configured, arranged and/or operable to communicate wirelessly with network nodes and/or other wireless devices. In certain embodiments, access point 110 and/or wireless device 115 includes a user equipment (UE) configured to communicate on an LTE or 5G NR network or a wireless access point configured to communicate according to one or more wireless standards, such as WiFi. Communicating wirelessly may involve transmitting and/or receiving wireless signals using electromagnetic waves, radio waves, infrared waves, and/or other types of signals suitable for conveying information through air.

In some embodiments, access point 110 and/or wireless device 115 may be configured to transmit and/or receive information without direct human interaction. For instance, access point 110 and/or wireless device 115 may be designed to transmit information to a network on a predetermined schedule, when triggered by an internal or external event, or in response to requests from the network. Examples of access point 110 and/or wireless device 115 include, but are not limited to, a wireless access point, a wireless router, a wireless repeater, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc.

Figure 2:
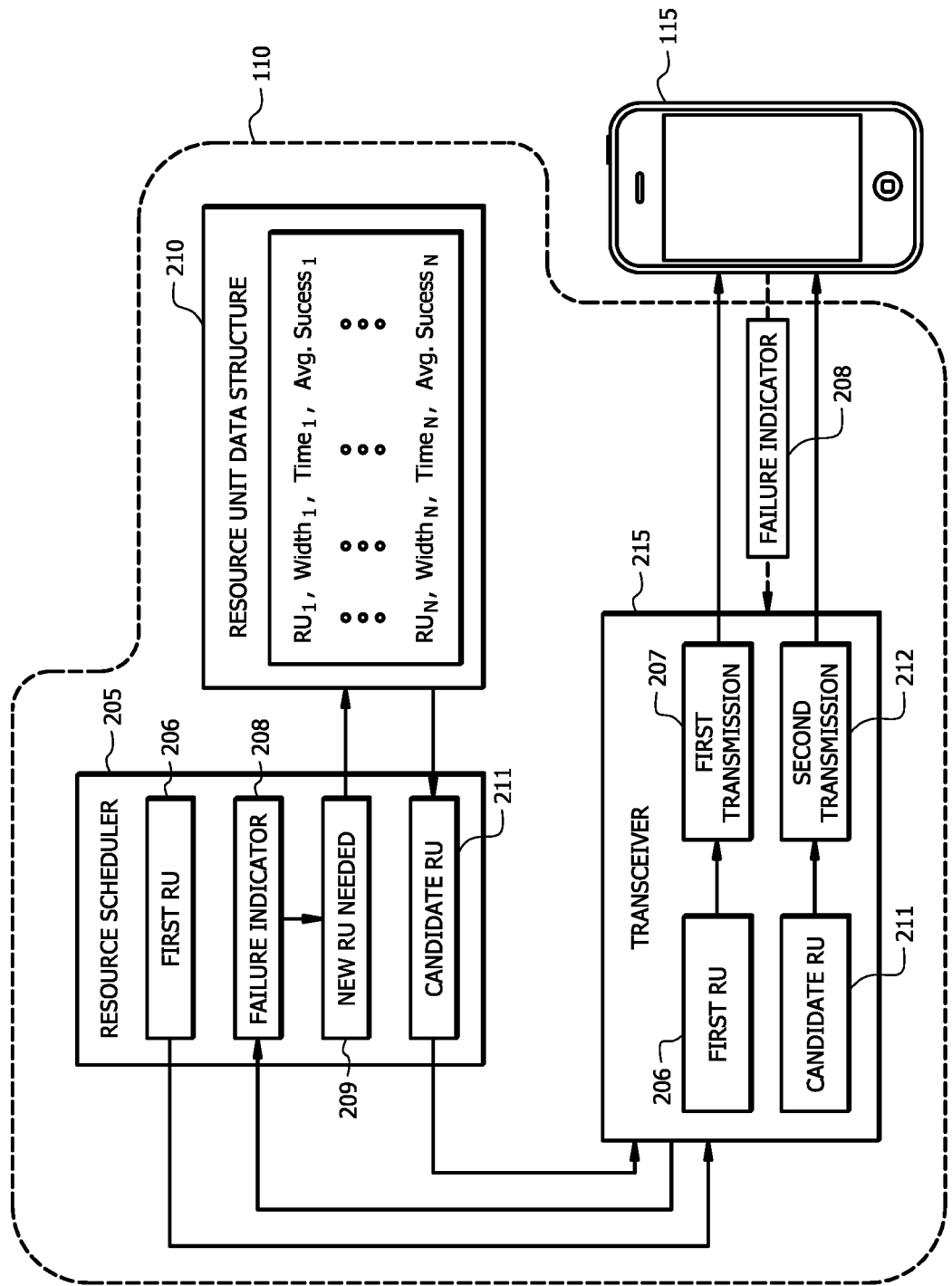
FIG. 2 illustrates the wireless access point in a first configuration, in accordance with certain embodiments.

FIG. 2 illustrates wireless access point 110 in a first configuration, in accordance with certain embodiments. As discussed above, access point 110 may select resource units for use in retries of transmissions, e.g., retransmissions, when a transmission has failed. Access point 110 may be configured to implement an improved selection of resource units that have an improved success rate for the retransmission. In certain embodiments, wireless access point 110 may include a resource scheduler 205, a resource unit data structure 210, and a transceiver 215. According to certain embodiments, resource scheduler 205 may determine a first RU 206 for use in a first transmission 207 to wireless device 115. First RU 206 may be determined by any suitable calculation or implementation of an algorithm, including using one of the techniques described herein.

First transmission 207 may be successful and no retransmission is necessary. In other circumstances, first transmission 207 is not successful or partially fails with respect to first RU 206 (e.g., the data or information transmitted on first RU 206 is not received at wireless device 115 or is unable to be decoded/demodulated at wireless device 115). In certain embodiments, a failure indicator 208 is communicated from wireless device 115 to access point 110, e.g., via transceiver 215. Alternatively, in certain embodiment access point 110 does not receive an indication that first transmission 207 failed or was not received at wireless device 115 from wireless device 115, directly or indirectly. In some embodiments, access point 110 implicitly determines that first transmission 207 was not successful and/or receives an indication from another portion of wireless network 100. In this manner, access point 110 may determine that first transmission 207 was not successful.

If first transmission 207 was not successful, access point 110 may attempt a retry of first transmission 207 or an unsuccessful portion thereof. In certain embodiments, resource scheduler 205 may receive failure indication 208 and determine the need for a new RU for a retransmission, e.g., second transmission 212. Resource scheduler 205 may select candidate RU 211 from available RUs, e.g., those identified in RU data structure 210, which may be assigned for second transmission 212 sent to wireless device 115 via transceiver 215. In this manner, access point 110 may select resources on which a retry of a failed transmission may be transmitted.

As described above, access point 110 may send and receive transmissions, e.g., first transmission 207, failure indication 208, and/or second transmission 212, e.g., via transceiver 215. Transceiver 215 may be any suitable transceiver capable of transmitting and/or receiving wireless signals, such as analog or digital signals. Transceiver 215 may include any suitable receiver and/or transmitter components and/or electronic circuitry capable of transmitting first transmission 207 and/or second transmission 212. In particular embodiments, access point 110 includes a Wi-Fi wireless transceiver module implemented in hardware and/or software as transceiver 215 or portion thereof.

In certain embodiments, access point 110 may select candidate RU 211 that has a high likelihood of success. For example, access point 110 may select candidate RU 211 that is different from first RU 206 used in first transmission 207. In particular, access point 110 may determine that based on the failure of first transmission 207, first RU 206 was interfered with, e.g., based on its timing, frequency, or other characteristics. Based on this understanding, access point 110 may select candidate RU 211 that is distant (e.g., has a low correlation with) from first RU 206, so that the chance of the same interference causing second transmission 212 to fail may be mitigated. Certain embodiments of how resource scheduler 205 and access point 110 may select candidate RU 211 are described in further detail below.

Resource scheduler 205 may use information stored at access point 110 or accessible by access point 110 to select candidate RU 211. According to certain embodiments, access point 110 may have stored RU data structure 210 at access point 110. In alternative embodiments, RU data structure 210 is stored externally to access point 110, e.g., at access point controller 120 or at another location, such as a remote server or database (not depicted). In such embodiments, access point 110 may be communicatively coupled to the location of RU data structure 210 and access information stored therein.

RU data structure 210 may store information regarding RUs used by access point 110 in communicating with wireless device 115 and other network nodes and/or terminal devices. In certain embodiments, RU data structure 210 stores information characterizing a set of RUs, e.g., RU1 through RUN, such as their width (e.g., the number of tones), times used or time last used, and/or an average success rate. RU data structure 210 may include RUs that are the top performing RUs, e.g., those having the highest success rate with wireless device 115, and/or RUs that have little track record or have not been used for transmissions to wireless device 115. The stored information by RU data structure 210 may be updated regularly and/or periodically to reflect the latest information available about the RUs.

For example, one or more RUs may be cycled in or out of RU data structure 210 based on its performance in subsequent transmissions or measurements. For example, the worst performing RU (e.g., based on a function of error rate, lowest reliably-achieved MCS, and/or undue performance correlation with another RU), may be removed from RU data structure 210 and replaced with another RU. In certain embodiments, the replacement RU is selected based on the frequency of the replacement RU compared to the frequencies of the RUs already present in RU data structure 210. In some embodiments, the replacement RU is selected based at least partially on a random parameter. In this manner, some differentiation between similarly configured access points (e.g., from the same vendor) is maintained so that the same RUs are not selected in the same order. In this manner, RU data structure 210 may maintain information about potential RUs that may be used in transmissions, and in particular, in retries of transmissions using a different RU than previously used.

Resource scheduler 205 may include the stored information to select candidate RU 211. As illustrated, RU data structure 210 includes a table of information for a list of RUs based on their usage for wireless device 115. In certain embodiments, RU data structure 210 may include lists of RUs for each wireless node and/or terminal device served by access point 110. In the event that first transmission 207 failed, resource scheduler 205 is configured to, according to certain embodiments, obtain the identity and width of the failed RU, here, first RU 206 for first transmission 207. Resource scheduler 205 may use the identity and width of RU 206 to select candidate resource 211. For example, candidate resource 211 may be selected as the RU with the highest probability of success that has the same width of failed first RU 206.

In a particular example, resource scheduler 205 may determine an RU from RU data structure 210 for wireless device 115 that is further in the frequency domain from first RU 206 with the same width. For the purposes of this disclosure, an RU may be distant from another if it has a low correlation with the other RU, e.g., based on the difference of the RU number for first RU and a potential candidate RU modulo a number X is the maximum out of each available RU in RU data structure 210. In certain embodiments, the modulus may be based on the maximum number or maximum index of RUs possible for the type of RU used, e.g., a 26-tone RU, a 52-tone RU, etc. In some embodiments, the modulus is also based on the bandwidth of the available resources from which the RU is assigned. In certain embodiments, the RU numbers are indices defined based on a standard, such as a Wi-Fi standard. In this manner, a "furthest" RU may be determined. This RU may have a higher chance of success as candidate RU 211 because it is distant from first RU 206 and may not suffer from the interference experience by first RU 206 that may have caused it to fail.

In certain embodiments, candidate RU 211 is not solely determined based on its distance or correlation with first RU 206. For example, the success rate of the determined furthest RU from RU data structure 210 may be compared with a threshold value. For example, if the success rate of the furthest RU is less than the average RU success rate at that width (the width of first RU 206), then the RU may be rejected. For example, if the success rate is below the threshold level, then it is unlikely to give better performance than merely repeating the use of first RU 206 (since it was likely selected based on its previous good performance). If the RU is rejected, the next further RU may be selected from RU data structure 210 and again compared to the threshold. This process may be repeated until a RU is selected that passes the threshold. In this manner, a RU may be selected that is both distant from first RU 206 and above a certain level of success. This selected RU may be determined to be candidate RU 211 that is used in second transmission 212.

In certain embodiments, resource scheduler 205 also determines a width of candidate resource 211. For example, in particular embodiments, the selected RU may exceed the average success rate threshold of RUs at that width, but resource scheduler 205 may implement a different threshold in determining the width for a candidate RU. In one example, the success rate of the selected RU is compared to a threshold success rate at the width of first RU 206. If the success rate is above the threshold, candidate RU 211 is the selected RU from the earlier process with the width the same as first RU 206.

If, however, the success rate of the selected RU is below the threshold, resource scheduler 205 may compare the success rate at the first width (the width of first RU 206) to the success rate at the next width (e.g., the next narrower width or the width having the next lower amount of tones). For example, the width may be downgraded if the success rate is higher. In some embodiments, the width is downgraded if the success rate improves above a threshold amount. In some embodiments, the success rate is not significantly improved, e.g., not above the downgrade threshold. Accordingly, the selected RU, e.g., the distant RU, may be rejected as candidate RU 211 and the next furthest RU may be selected and processed in the manner described above, in accordance with certain embodiments. As a result, resource scheduler 205 may select both candidate RU 206 and the width of candidate RU 206 that may have a high or improved likelihood of success in second transmission 212.

In certain embodiments, the one or more thresholds described above may be predetermined by access point 110 or provided to access point 110 during operation or installation. For example, one or more of the thresholds may be based on measurements from similar deployments of wireless access points and the success rates of those deployments. In some embodiments, one or more of the thresholds may be adjusted based on measurements at access point 110, e.g., based on the success or failure of the systematic selection of candidate resource 211 and/or the load on access point 110 or the traffic/congestion of wireless network 100. For example, certain thresholds may yield better results in selecting candidate RU 211, e.g., based on the balance between distance from first RU 206 and its historical success rate. As another example, if the load is high on access point 110 or there is a lot of congestion on wireless network 100, access point 110 may adjust the thresholds to be more lenient with the selection of candidate RU 211, e.g., having lower thresholds for average success rate or success rates at the previous width. In this manner, the access point 110 may use suitable thresholds and values in determining candidate resource 211.

In certain embodiments, resource scheduler 205 may select candidate RU 211 randomly from available RUs listed in RU data structure 210. For example, access point 110 may not go through the process described above, and instead merely select a random RU for second transmission 212. This may be less resource intensive and decrease the time required to send second transmission 212. In certain embodiments, candidate RU 211 is selected randomly only if first RU 206 was selected based on the above-described process based on the average success rate of first RU and the correlation between first RU and the RU used before it. In some embodiments, resource scheduler 205 may alternate between random selection and the above-described process. As a result, a compromise between immediate selection and retransmissions and high likelihood of success RU selection may be realized that enhances wireless communications. In some embodiments, the ratio of random RU selection to non-random selections is 1 to 1, 2 to 1, 1 to 2, or any other ratio 1 to N or N to 1.

In certain embodiments, the functionality of resource scheduler 205 may be implemented centrally, e.g., at access point controller 120. In such cases, access point 110 may obtain an indication of candidate resource 211 (and its width) based on first RU 206 from access point 120. In some embodiments, the calculation of candidate RU 211 based on first RU 206 may be pre-calculated, e.g., by access point 110 and/or access point controller 120, so that the selection of candidate RU 211 is not delayed by additional processing, thereby increasing the speed at which second transmission 212 may be transmitted.

In certain embodiments, access point 110 determines candidate RU 211 as a wider RU (e.g., with less tones). For example, access point 110 may implement dynamic fragmentation, allowing resource scheduler 205 to fill available RUs up to the available maximum duration. Accordingly, the width of candidate RU 211 may be widened or maintained the same, but include more redundancy or robustness in second transmission 212, e.g., more redundant bits or different MCS.

In certain embodiments, the selection of candidate RU 211 is based on metrics including one or more uplink client Received Signal Strength Indicator (RSSI) metrics and/or Request to Send/Clear to Send (RTS/CTS) failures for wireless client 115. For example, such metrics or information may be used by access point to determine if the failure of first transmission 207 on first RU 206 was due to interference or noise. The determination by resource scheduler 205 may be based on this determination.

Figure 3:
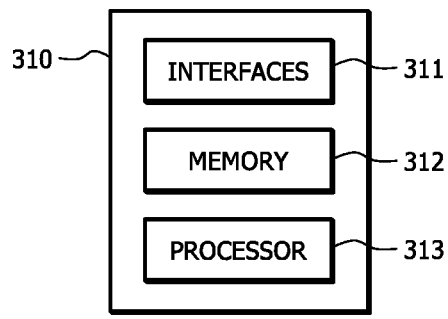
FIG. 3 illustrate an example wireless access point in a second configuration, in accordance with certain embodiments.

FIG. 3 illustrates a configuration of a wireless access point, AP, 310, according to certain embodiments. In certain embodiments, AP 110 is configured in a like manner. AP 310 includes one or more interfaces 311, a memory 312 and a processor 313. AP 310 may include multiple sets of one or more of the illustrated components for different wireless technologies supported by AP 310, such as, for example, GSM, WCDMA, LTE, NR, WiFi, WiMAX, or Bluetooth wireless technologies, just to mention a few. These wireless technologies may be integrated into the same or different chips or set of chips as other components within AP 310.

Interfaces 311 may include one or more antennas or antenna arrays, configured to send and/or receive wireless signals. In certain alternative embodiments, interfaces 311 may not include an antenna, but may include an interface for interfacing with an external antenna connectable to AP 310 through one of interfaces 311. Interfaces 311 and/or processor 313 may be configured to perform any receiving or transmitting operations described herein as being performed by AP 310, respectively. Any information, data and/or signals may be received from a network node and/or another wireless node.

In certain embodiments, interface 311 includes one or more of radio front end circuitry and an antenna. For example, interfaces 311 may include one or more filters or amplifiers that is connected to transmission components. In some embodiments, interfaces 311 are configured to or receive analog or digital data that is sent out to other nodes or terminal devices via a wireless connection. In some embodiments, interfaces 311 may include circuitry configured to convert data from digital to analog and vice versa. Signals and data received may be passed to processor 313, respectively. Accordingly, interfaces 311 may include any suitable interfacing components for receiving and/or transmitting wireless communications.

In certain embodiments, interfaces 311 may also include one or more interfaces for communicating between different components of AP 310, including any components described in FIG. 2 of AP 110, such as resource scheduler 205, RU data structure 210, and/or transceiver 215.

Processor 313 may include be any electronic circuitry, including, but not limited to microprocessors, application specific integrated circuits (ASIC), application specific instruction set processor (ASIP), and/or state machines, that communicatively couples to memory 312 respectively, and controls the operation of AP 310. Processor 313 may be 8-bit, 16-bit, 32-bit, 64-bit or of any other suitable architecture. Processor 313 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 313 may include other hardware and software that operates to control and process information.

Processor 313 executes software stored on memory 312, to perform any of the functions described herein. For example, processor 313 may control the operation and administration of AP 310 by processing information received from memory 312, or any external databases, or any other components of the wireless network in which it is deployed. In certain embodiments, processor 313 may be configured to carry out one or more functions of AP 110, or any components thereof, such as resource scheduler 205, RU data structure 210, and/or transceiver 215.

Processor 313 may be a programmable logic device, a microcontroller, a microprocessor, any suitable processing device, or any suitable combination of the preceding. Processor 313 is not limited to a single processing device and may encompass multiple processing devices. In certain embodiments, processor 313 includes one or more of wireless transceiver circuitry, wireless signal processing circuitry, and application processing circuitry. In other embodiments, the processor 313 may include different components and/or different combinations of components. In certain embodiments processor 313 includes a system on a chip. In some embodiments, processor 313 or components thereof may be on a single chip, separate chips, or a set of chips.

Memory 312 may store, either permanently or temporarily, data, operational software, or other information for processor 313. In certain embodiments, memory 312 may store information used in the process of determining resource units for transmissions and/or transmitting information to wireless device 115, such as RU data structure 210, first RU 206, candidate RU 211, failure indicator 208, first transmission 207, and/or second transmission 212. Memory 312 may include any one or a combination of volatile or non-volatile local or remote devices suitable for storing information. For example, memory 312 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 312, a disk, a CD, or a flash drive. Memory 312 may be operable to store a computer program, software, an application including one or more of logic, rules, code, tables, etc. and/or other instructions capable of being executed by processor 313. In particular embodiments, the software may include an application executable by processor 313 to perform one or more of the functions described herein. In certain embodiments, memory 312 may be or implemented as a NoSQL database. In some embodiments, processor 313 and memory 312 may be considered to be integrated.

In certain embodiments, some or all of the functionality described herein as being performed by AP 310 (and AP 110) may be provided by processor 313, respectively, executing instructions stored on memory 312, respectively, which in certain embodiments may be a computer-readable storage medium. In alternative embodiments, some or all of the functionality may be provided by processor 313 without executing instructions stored on a separate or discrete device readable storage medium, such as in a hard-wired manner. In any of those particular embodiments, whether executing instructions stored on a device readable storage medium or not, processor 313 can be configured to perform the described functionality.

Processor 313 may be configured to perform any determining, calculating, or similar operations (e.g., certain obtaining operations) described herein as being performed by AP 310. These operations, as performed by processor 313, may include processing information obtained by processor 313 by, for example, converting the obtained information into other information, comparing the obtained information or converted information to information stored by AP 310, and/or performing one or more operations based on the obtained information or converted information, and as a result of said processing making a determination.

In particular embodiments, one or more functions described herein relating to AP 110 may be implemented using one or more interfaces 311, memory 312, and processor 313, their equivalents, or any suitable combination of hardware and software as understood by persons having skill in the art capable of carrying out one or more functions or methods described herein.

Figure 4:
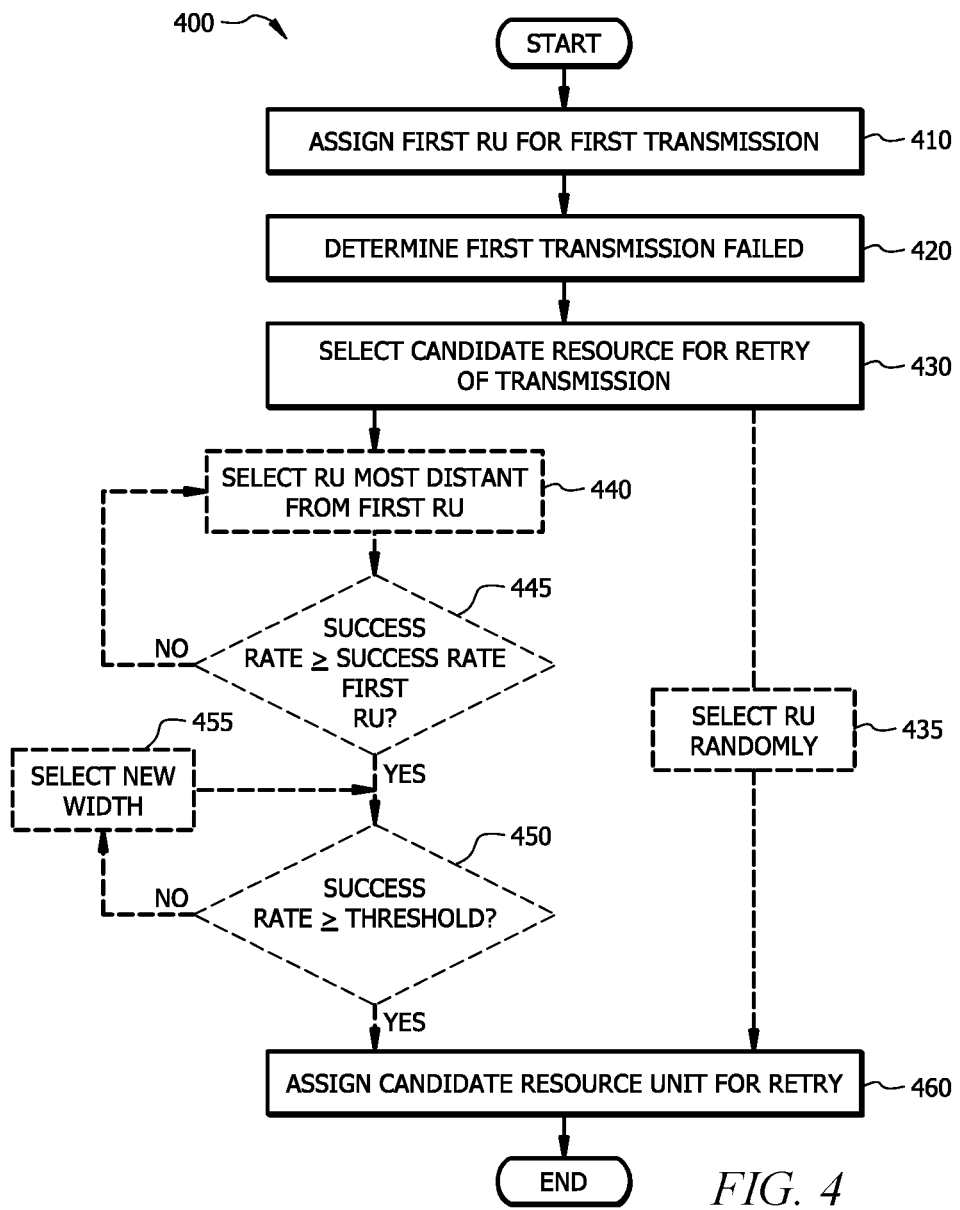
FIG. 4 is a flowchart diagram of an example method in a wireless access point, in accordance with certain embodiments.

FIG. 4 is a flowchart diagram of example method 400. At step 410, a first RU is assigned for a first transmission to a wireless client. For example, resource scheduler 205 of access point 110 may assign first RU 206 for first transmission 207 to wireless client 115. At step 420, the failure of the first transmission using the first RU is determined. For example, the access point may receive an explicit failure indication, such as failure indication 208, or determine the failure of the first transmission implicitly or via another indication from wireless network 100.

At step 430, a candidate resource is selected for a retry of the transmission. In certain embodiments, the candidate resource unit is selected based on at least an average previous success rate of the candidate resource unit and a correlation between the candidate resource unit and the first resource unit. For example, as described herein, the candidate resource may be selected as the most distant available RU that exceeds one or more performance thresholds based on historical performance of the RU with communications with the wireless client. As another example, the candidate resource may be selected as candidate resource 211 is selected by resource selector 205 of access point 110, according to certain embodiments described herein. In this manner, a candidate resource may be selected that is likely to have a high success rate based on its distance from the failed RU, e.g., likely avoiding similar interference, and its previous success, e.g., likely avoiding previously encountered interference or other limitations of that RU.

In certain embodiments, step 430 may include one or more optional substeps. For example, in certain embodiments, step 430 includes substep 435 in which the candidate RU is selected randomly. For example, if the first RU was selected in the systematic manner described herein, the candidate RU may be selected randomly. As another example, the candidate RU may be selected randomly if there is congestion above a certain threshold amount or below a threshold amount. In particular, if congestion is high, then the systematic method of selecting a candidate RU may yield no results or results that have an equal probability of success and therefore it would be a waste or poor use of processing resources. Alternatively, if there is very low congestion on the wireless network, then a random RU is likely to have a high likelihood of success so the resources required to systematically select a candidate RU would not yield a much improved choice. In this manner, there may be some random selection of RUs depending on how the first RU was selected and/or the wireless conditions at the access point.

In another set of embodiments, step 430 may include one or more of optional substeps 440, 445, 450, and 455. At step 440, the most distant RU from the first RU is selected as the candidate resource. For example, the candidate resource may be the most distant RU for which statistics are maintained, e.g., in RU data structure 210. At step 445, it is determined whether the success rate of the candidate RU is greater than or equal to the average previous success rate of all available resource units at a width of the first resource unit. If not, then method 400 may return to step 440 and select the RU that is most distant from the first RU, excluding the previous candidate resource RU. The steps 440 and 445 may iterate until a candidate RU has a success rate exceeding that of the average previous success rate of all available resource units at a width of the first resource unit.

In certain embodiments, step 430 further includes substep 450, in which it is determined whether the success rate of the candidate resource is above a threshold. For example, the success rate of the candidate resource may be compared to a threshold success rate for the width of the failed first resource unit. If below the threshold, the method may proceed to optional step 455, in which a new width is assigned to the candidate resource. Based on this new width, the comparison at step 450 may be repeated. If the candidate RU with the new width exceeds or meets the threshold, the candidate resource with that width is selected for assignment for the retry transmission, e.g., as in step 460. Alternatively, if, after iterating through different widths, the candidate resource unit does not exceed the threshold, the method may return to step 440 to select a different candidate resource. In this manner, both the candidate resource and its width may be determined in step 430.

At step 460, the candidate resource is assigned for the retry of the transmission. For example, candidate resource 211 may be assigned to second transmission 212 that is a retransmission of first transmission 207. In this manner, a retry of the failed transmission may be made with resource units that have a high chance of success. In certain embodiments, steps 420, 430, and 460 may be repeated in the event that the retry of the transmission fails. In other embodiments, if the retry of the transmission fails, then the selection of the candidate resource unit in step 430 is selected randomly, as in optional substep 435. In certain embodiments, the selection of the candidate resource in the systematic way described herein and in a random manner are alternated for subsequent retries of transmissions.

Modifications, additions, or omissions may be made to method 400 depicted in FIG. 4. Method 400 may include more, fewer, or other steps. Additionally, steps may be performed in parallel or in any suitable order. While discussed as access point 110 and/or access point 310 as performing certain steps, any suitable component of access point 110 and/or access point 310 may perform one or more steps of the methods. Additionally, method 400 may include any suitable step to carry out any of the described functions of access point 110 and/or access point 310. Further, any of steps of method 400 may computerized and/or carried out using hardware, such as processor 313 of access point 310, or any other suitable system implementing one or more components of access point 110 and/or access point 310, such as any hardware or software implementing resource scheduler 205, RU data structure 210, and/or transceiver 215.

In addition, techniques, systems, subsystems, and methods described and illustrated in the various embodiments as discrete or separate may be combined or integrated with other systems, modules, techniques, or methods without departing from the scope of the present disclosure. Other items shown or described as coupled or directly coupled or communicating with each other may be indirectly coupled or communicating through some interface, device, or interme-

The invention claimed is:

1. A wireless access point in a wireless communications network, the wireless access point comprising:
   one or more interfaces configured to receive wireless transmissions;
   a memory comprising instructions; and
   a hardware processor;
   wherein the wireless access point, when executing the instructions at the hardware processor, is configured to:
   assign a first resource unit for a first transmission between the wireless access point and a wireless terminal;
   determine that the first transmission using the first resource unit failed;
   select a candidate resource unit for a retry transmission, wherein the candidate resource unit is selected based on at least an average previous success rate of available resource units at a width of the first resource unit and a correlation between the candidate resource unit and the first resource unit; and
   assign the candidate resource unit for the retry transmission if a success rate of the candidate resource unit is above a predetermined threshold.

2. The wireless access point of claim 1, wherein:
   the candidate resource unit is only selected based on at least an average previous success rate of all available resource units at a width of the first resource unit and a correlation between the candidate resource unit and the first resource unit if the first resource unit was selected by the wireless device randomly; and
   the wireless access point is further configured to select the candidate resource unit randomly if the first resource unit was not selected randomly.

3. The wireless access point of claim 1, the wireless access point further configured to select a width of the candidate resource unit based on a success rate of the of the candidate resource unit at a width of the first resource unit.

4. The wireless access point of claim 3, wherein the wireless access point is configured to select the width of the candidate resource unit by at least one of:
   selecting the width of the candidate resource unit to be the same width of the first resource unit if the success rate of the of the candidate resource unit at the width of the first resource unit exceeds a predetermined threshold; and
   selecting the width of the candidate resource unit to be different from the width of the first resource unit if the success rate of the of the candidate resource unit at the width of the first resource unit does not exceed a predetermined threshold.

5. The wireless access point of claim 1, wherein the wireless access point is further configured to:
   obtain one or more statistics for previous transmissions involving the wireless access point, wherein the one or more statistics comprises an average success rate for each resource unit used in the previous transmissions; and
   maintain a data structure comprising the one or more statistics, wherein the average success rate is associated with its respective resource unit in the data structure; and
   update the data structure in response to obtaining additional statistics from a new transmission, wherein updating the data structure comprises recalculating the average success rates for each resource unit in the data structure.

6. The wireless access point of claim 5, wherein:
   the data structure comprises data only for a subset of resource units usable by the wireless access point, wherein the subset of resource units comprises resource units having the highest associated average success rates; and
   the candidate resource is selected from the subset of resource units for which data is stored in the data structure.

7. The wireless access point of claim 1, wherein the wireless access point is configured to select the candidate resource unit by selecting an available resource unit that is most distant from the first resource unit.

8. The wireless access point of claim 1, wherein the wireless access point is configured to select the candidate resource unit further based on a comparison of the average previous success rate of the candidate resource unit and the average previous success rate of all available resource units at a width of the first resource unit.

9. The wireless access point of claim 1, wherein the wireless access point is further configured to reject a resource unit as the candidate resource unit if the average previous success rate of the resource unit is less than the average previous success rate of all available resource units at a width of the first resource unit.

10. A method in a wireless communications network, the method comprising:
    assigning a first resource unit for a first transmission between a wireless access point and a wireless terminal;
    determining that the first transmission using the first resource unit failed;
    selecting a candidate resource unit for a retry transmission, wherein the candidate resource unit is selected based on at least an average previous success rate of available resource units at a width of the first resource unit and a correlation between the candidate resource unit and the first resource unit; and
    assigning the candidate resource unit for the retry transmission if a success rate of the candidate resource unit is above a predetermined threshold.

11. The method of claim 10, wherein:
    the candidate resource unit is only selected based on at least an average previous success rate of all available resource units at a width of the first resource unit and a correlation between the candidate resource unit and the first resource unit if the first resource unit was selected by the wireless device randomly; and
    the method further comprises selecting the candidate resource unit randomly if the first resource unit was not selected randomly.

12. The method of claim 10, further comprising selecting a width of the candidate resource unit based on a success rate of the of the candidate resource unit at a width of the first resource unit.

13. The method of claim 12, wherein the width of the candidate resource unit is selected by at least one of:
    selecting the width of the candidate resource unit to be the same width of the first resource unit if the success rate of the of the candidate resource unit at the width of the first resource unit exceeds a predetermined threshold; and
    selecting the width of the candidate resource unit to be different from the width of the first resource unit if the success rate of the of the candidate resource unit at the width of the first resource unit does not exceed a predetermined threshold.

14. The method of claim 10, further comprising:

obtaining one or more statistics for previous transmissions involving the wireless access point, wherein the one or more statistics comprises an average success rate for each resource unit used in the previous transmissions; and maintaining a data structure comprising the one or more statistics, wherein the average success rate is associated with its respective resource unit in the data structure; and updating the data structure in response to obtaining additional statistics from a new transmission, wherein updating the data structure comprises recalculating the average success rates for each resource unit in the data structure.

15. The method of claim 14, wherein:

the data structure comprises data only for a subset of resource units usable by the wireless access point, wherein the subset of resource units comprises resource units having the highest associated average success rates; and the candidate resource is selected from the subset of resource units for which data is stored in the data structure.

16. The method of claim 10, wherein selecting the candidate resource unit comprises selecting an available resource unit that is most distant from the first resource unit.

17. The method of claim 10, wherein selecting the candidate resource unit is further based on a comparison of the average previous success rate of the candidate resource unit and the average previous success rate of all available resource units at a width of the first resource unit.

18. The method of claim 10, further comprising rejecting a resource unit as the candidate resource unit if the average previous success rate of the resource unit is less than the average previous success rate of all available resource units at a width of the first resource unit.

* * * * *